United States Patent [19]

Holzer

[11] Patent Number: 4,768,557
[45] Date of Patent: Sep. 6, 1988

[54] PROCEDURE AND DEVICE FOR THE OPERATION OF WATER MIXER UNIT

[76] Inventor: Walter Holzer, Drosteweg 19, Meersburg, Fed. Rep. of Germany, 7758

[21] Appl. No.: 841,876

[22] Filed: Mar. 20, 1986

[30] Foreign Application Priority Data

| Mar. 26, 1985 [DE] | Fed. Rep. of Germany | 3510930 |
| May 2, 1985 [DE] | Fed. Rep. of Germany | 3515758 |
| May 15, 1985 [DE] | Fed. Rep. of Germany | 3517565 |

[51] Int. Cl.$^4$ .............................................. F16K 31/58
[52] U.S. Cl. ........................... 137/636.2; 137/625.17; 137/625.4; 137/616; 137/616.3; 137/801; 251/351
[58] Field of Search ........... 137/625.17, 625.4, 625.41, 137/616.3, 616.5, 615, 801, 636.2; 251/349, 351, 352

[56] References Cited

U.S. PATENT DOCUMENTS

| 681,315 | 8/1901 | Hedges | 137/616.5 |
| 1,138,187 | 5/1915 | Bridges | |
| 1,590,323 | 6/1926 | Schubert | |
| 2,707,486 | 5/1955 | Johns | 137/625.41 |
| 2,980,142 | 4/1961 | Turak | 137/637.3 |
| 3,168,113 | 2/1965 | McJohnson | 137/616.5 |
| 3,322,152 | 5/1967 | Aechter | 251/352 X |
| 3,380,478 | 4/1968 | Garrison | 137/625.41 |
| 3,726,318 | 4/1973 | Hyde | 137/625.41 |
| 3,765,455 | 10/1973 | Countryman | 137/625.4 |
| 3,980,101 | 9/1976 | Kurioka | 137/616.5 |
| 4,019,536 | 4/1977 | Dong et al. | 137/625.41 |
| 4,163,460 | 8/1979 | Zucchetti | 137/625.4 |
| 4,200,123 | 4/1980 | Brandelli | 137/625.4 |
| 4,346,735 | 8/1982 | Raz | 251/352 X |

FOREIGN PATENT DOCUMENTS

| 117199 | 2/1984 | European Pat. Off. |
| 1175048 | 7/1964 | Fed. Rep. of Germany |
| 2144373 | 1/1974 | Fed. Rep. of Germany |
| 2359312 | 6/1974 | Fed. Rep. of Germany |
| 3013651 | 10/1981 | Fed. Rep. of Germany |
| 2953331 | 10/1982 | Fed. Rep. of Germany |
| 3244175 | 5/1984 | Fed. Rep. of Germany |
| 1348265 | 5/1970 | United Kingdom |

Primary Examiner—John Rivell
Attorney, Agent, or Firm—Majestic, Gallagher, Parsons & Siebert

[57] ABSTRACT

A mixer-unit is attached to the cold and hot water mains and serves to adjust the quantity and temperature of the water. The mixer unit is not fitted with an operating handle or lever, the adjustment of the water quantity and temperature is achieved by pivoting the water outlet about two independent axes of movement. Disc-shaped regulating elements serve for the independent adjustment of both the water quantity and temperature which are operable by means of a cam connected to the rotatable and pivotable water outlet.

26 Claims, 7 Drawing Sheets

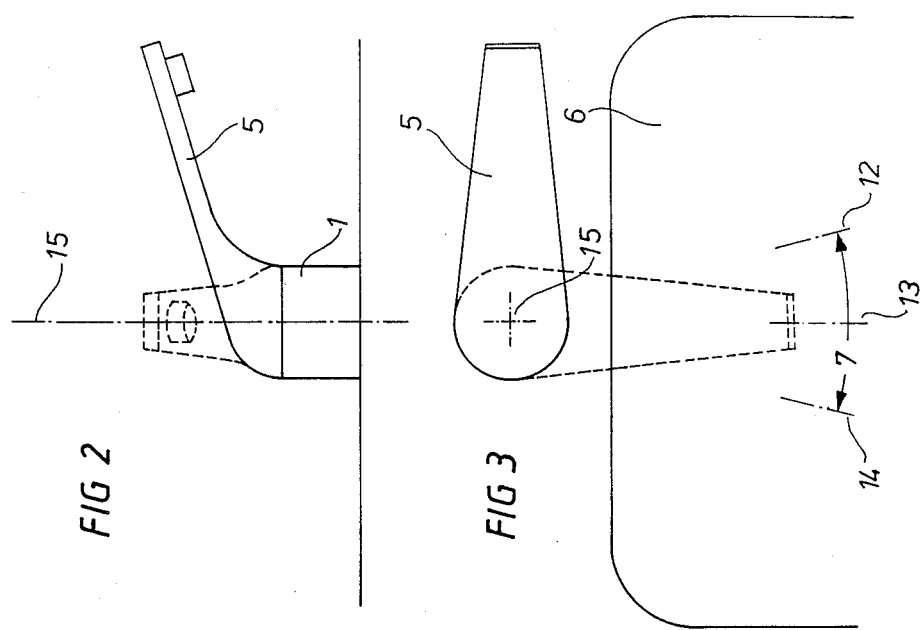
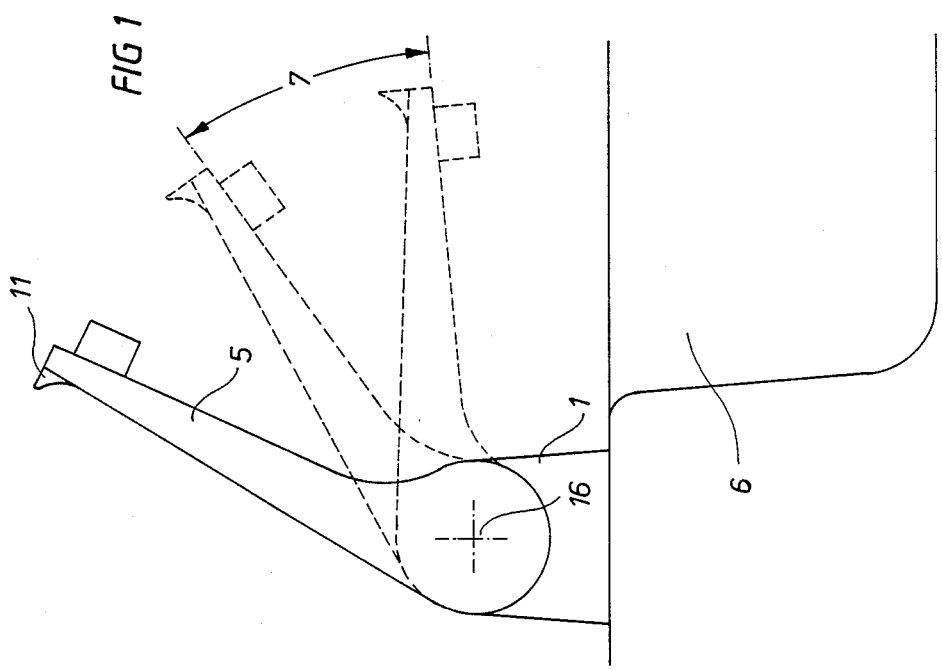

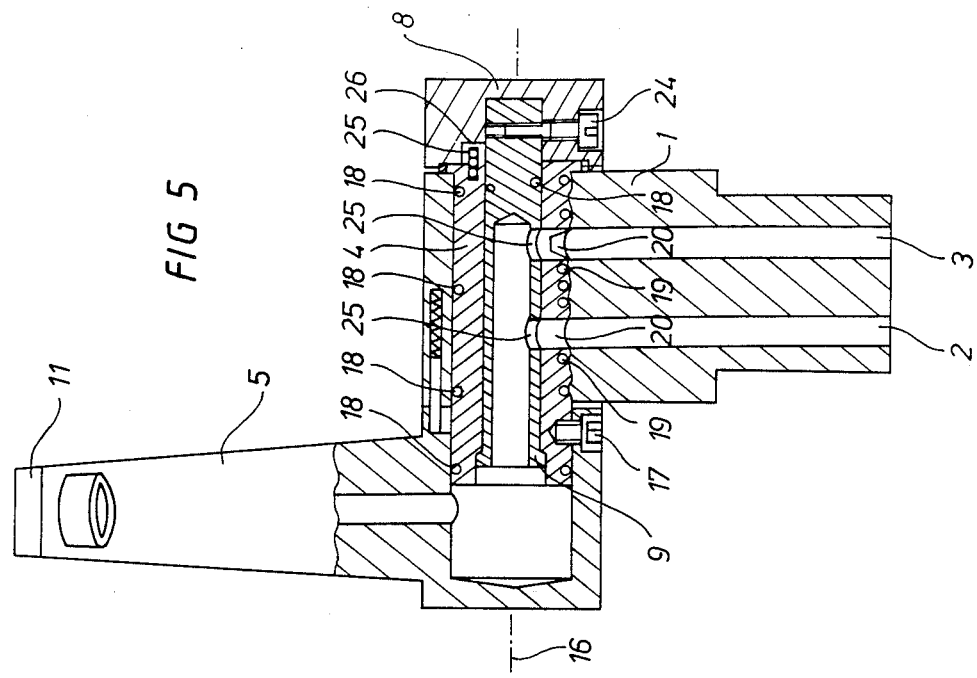
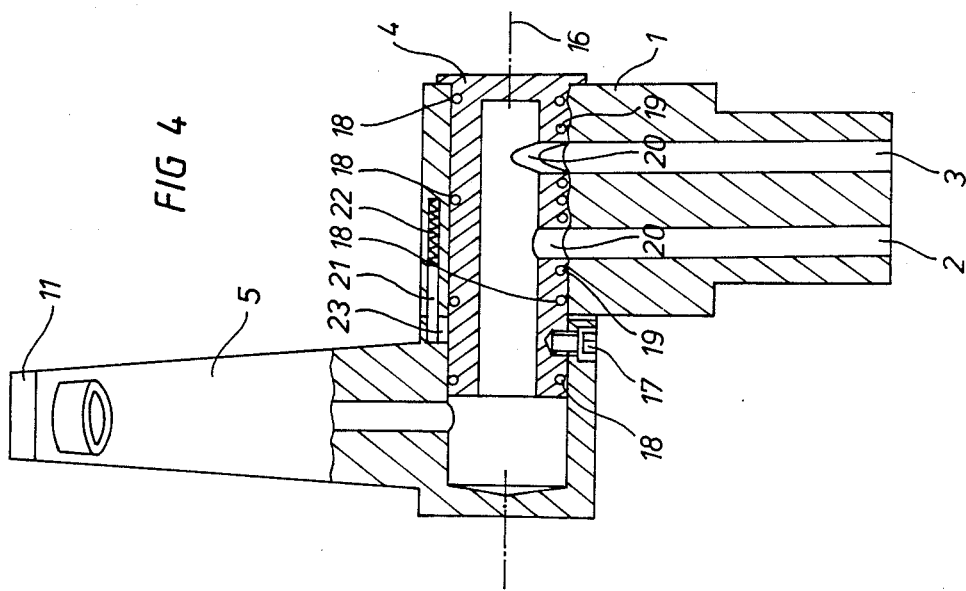

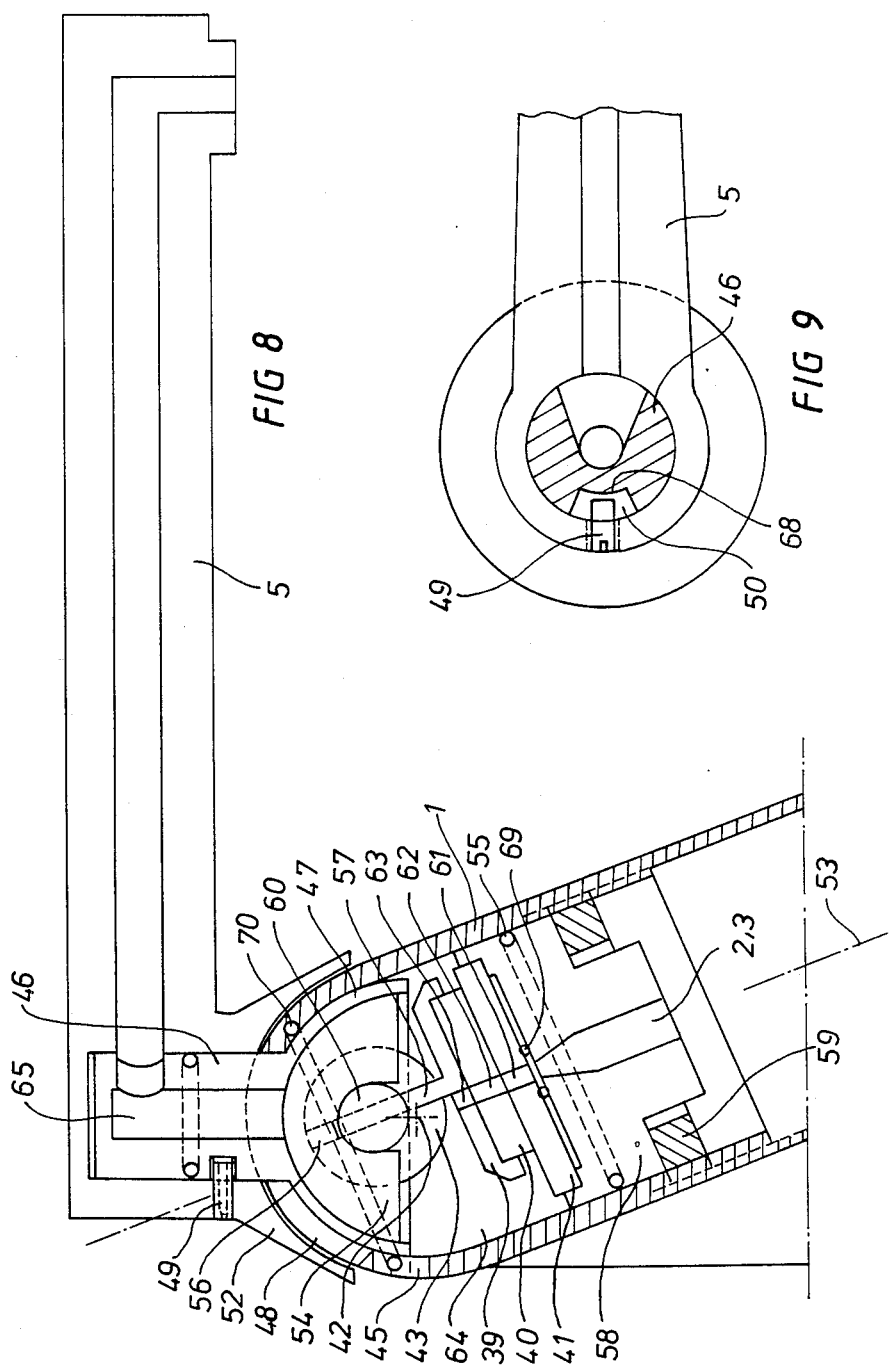

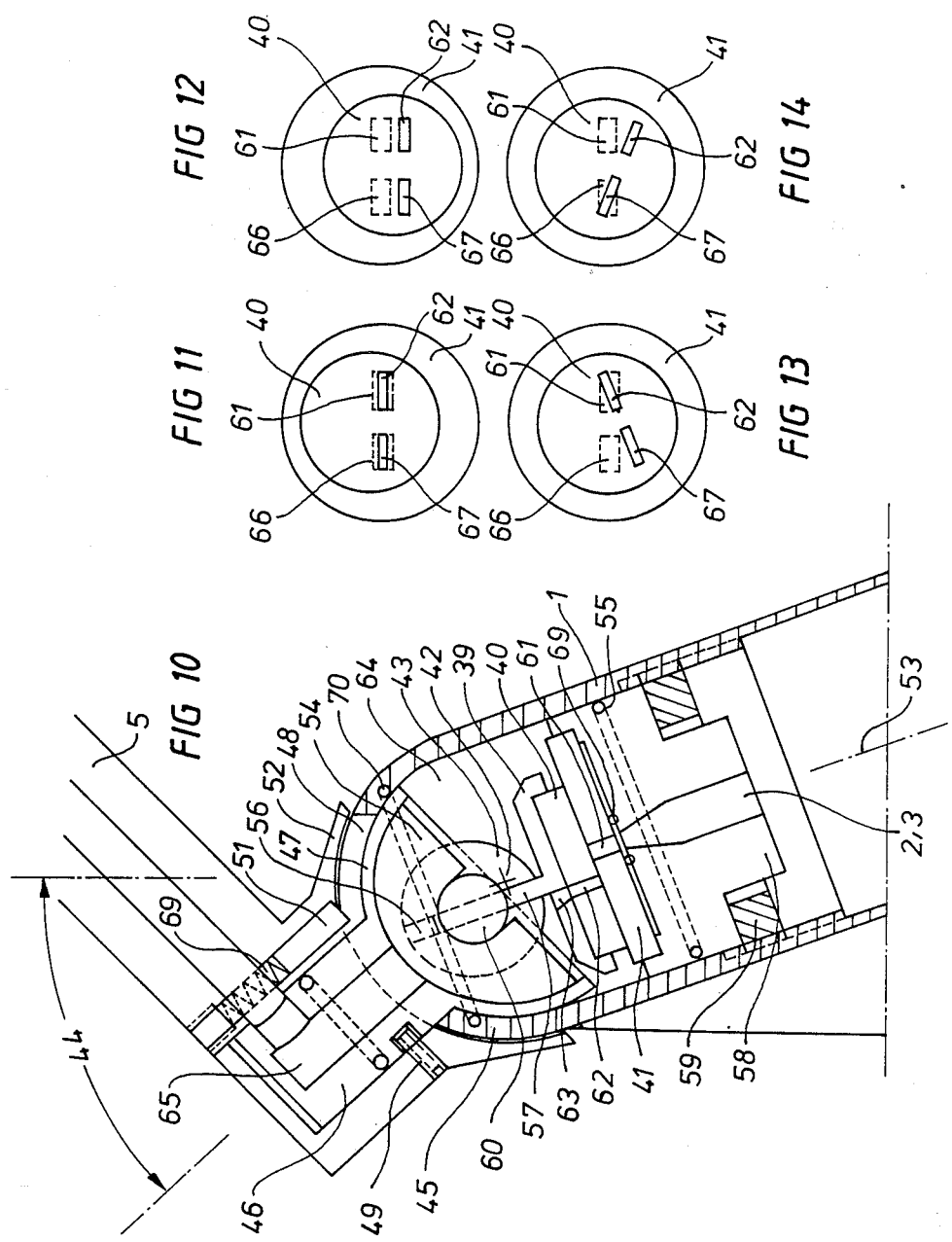

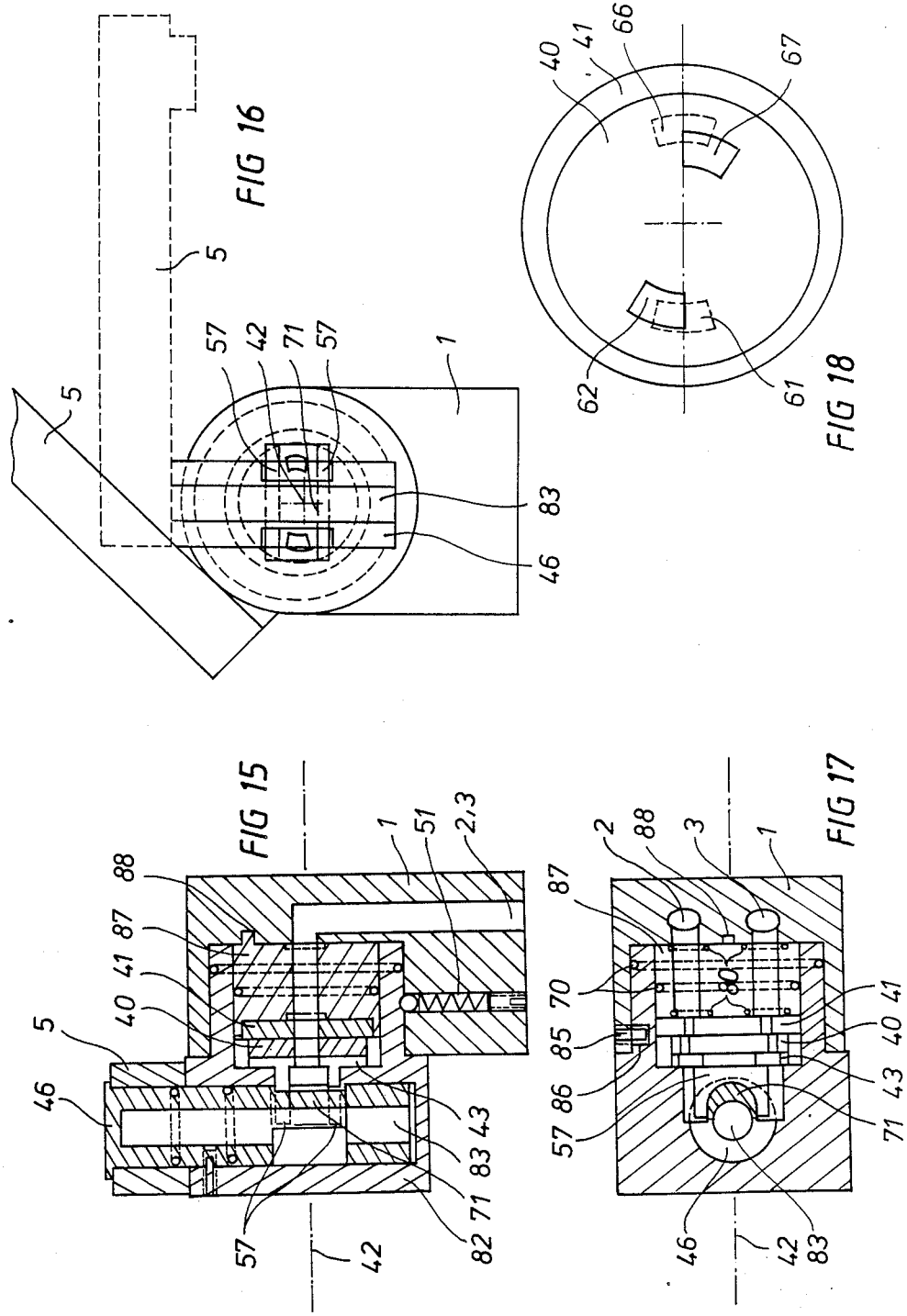

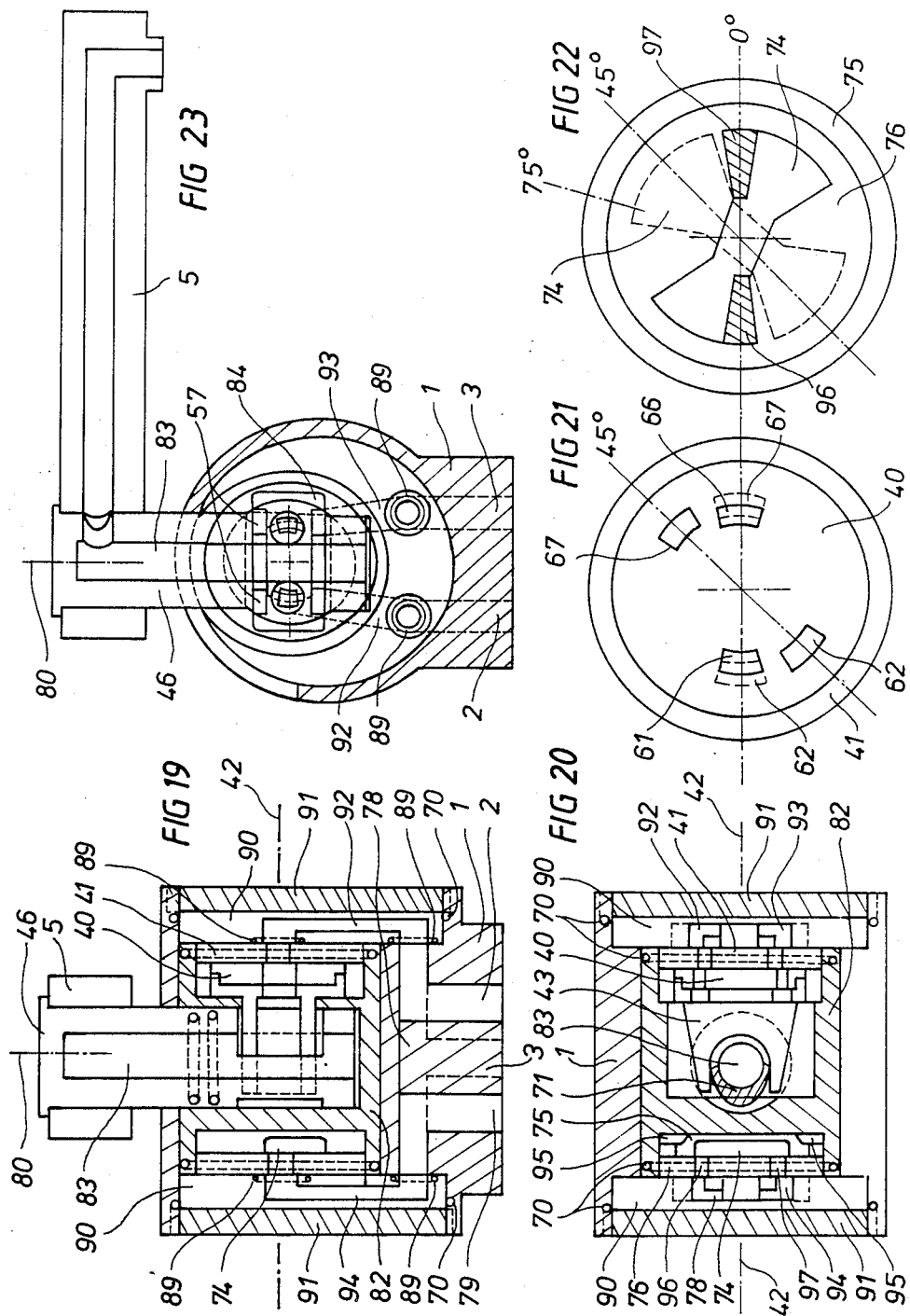

PROCEDURE AND DEVICE FOR THE OPERATION OF WATER MIXER UNIT

BACKGROUND OF THE INVENTION

Water taps serve to open and close the hot and cold water supply as required. Mixer units permit mixing of hot and cold water with the object of arriving at a specific temperature. Mixer units with thermostatic regulation maintain the pre-set temperature at a constant, completely independent of water supply pressure fluctuations and temperature variations.

It is common to all mixer units that to open the hot and cold supplies and to adjust the required temperature, several hand grips are necessary to simplify which all possible conceivable means are tried. This leads to elaborate one-hand mixer units by which it is possible with one hand grip, mostly by turning and moving, to adjust the desired quantity and temperature of the water. The same is also true of thermostatic one-hand mixer units.

All have at least one, more or less, complex grip for the setting of these values.

BRIEF SUMMARY OF THE INVENTION

It will now be proposed, in accordance with the invention, that by means of pivoting the water outlet, the water quantity and/or temperature is influenced, without a special grip.

This means a substantial simplification of design and also operating advantages. Often the hand grips are slippery, and above all are difficult to operate with wet or greasy fingers. Pivoting of the water outlet with its long lever is possible in every case.

The requirement to avoid an operation of the hand grip with dirty or also with just washed sterile fingers leads to complicated designs with ultra sonics, radar and the like.

For this reason hospitals often install mixer units with a particularly long lever which can be switched off and on by the back of the hand or the elbow.

The influencing of the water quantity and/or temperature by pivoting of the water outlet thoroughly solves this problem, no matter if the water outlet pivots about an almost vertical axis or about an axis which is almost horizontal, and which lays somewhat oblique to the operator standing in front of it.

A combination of both pivoting movements, in accordance with the invention, about a vertical and horizontal axis permits the adjustment of both the water quantity and the temperature of the water. It is greatly advantageous here that the operating method at the end of the long water outlet makes possible a delicate and exact adjustment which is not the case with the current designs with their comparatively small hand grips.

The pivot area is, according to the invention, selected to be advantageously large whereby one can direct all of the water outlet onto the area of useage, e.g., a wash basin, to be comfortably able to wash hair or clean teeth. This wide pivoting-out should in accordance with the invention, firstly be after the area in which the regulating elements are influenced such as, for example, the regulating elements which reduce the water supply to zero, i.e. shut it off. By pivoting inwards again the water supply is only opened by the regulating elements when the water outlet is above the wash basin. If one dispenses with the combination of two pivoting movements in the interests of simplicity of operation, the known regulating sequence is recommended, in accordance with the invention, that first the cold water supply is gradually opened and, by means of further pivoting of the water outlet, hot water is mixed, in increasing quantities while the flow of cold water either remains constant or decreases.

It is advantageous in such a case when means for pre-adjustment are available which determine the maximum water quantity output and/or the desired temperature, e.g. by a thermostat.

An advantageous design of water mixer unit according to the invention, is to connect a regulating element rigidly directly on to the water outlet. This results in simple construction and economic layout.

In accordance with the invention the feasibility of mounting further regulating elements co-axially on the water outlet will be proposed, which, in this fashion solve complex demands and use rotating parts that can be economically manufactured.

New methods are demonstrated by operation of the regulating elements by a cam arranged on the water outlet, particularly in the case of a combination of two pivot movements.

Particularly preferred is the use of totaly reliable ceramic discs as regulating elements.

Particular prominence is due to the kinematic arrangement; the pivoting of the water outlet about two axes, the planar regulating surfaces of the parts moving towards each other in one rotation and one sliding movement. In accordance with the invention, it will be proposed to connect a transmission part either form-locking or fixed to both pivot movements of the water outlet, but at least, and/or to couple with one of the parts.

As the movements follow, on the one side in a space about two axes and, on the other side co-planar as a sliding or turning, it will be proposed to use a universal joint for the transmission part that is rotatable randomly about two vertically superimposed axes. Therewith a transforming of a spatial pivot movement into a rotational movement in the plane of the regulating surfaces is possible.

It will be additionally proposed to arrange one of the axes of the universal joint parallel to, for example, the pivot axis which determines the water quantity output, however not co-incident with it, but at a determined distance between the axes, which serves as a lever to slide the parts together.

It is advantageous to mount an approximately hemispherical sealing surface in a guide housing which has a slot from which protrudes a connective piece, which supplies the connection to the water outlet. The water outlet is therewith either fixed or form locking connected to the sealing surface by the connecting piece and can be pivoted about the pivot axis by these parts.

To prevent the ingress of dirt and foreign bodies in the slot and also for reasons of design, it is advisable to completely or partially close it with a cover.

In the first part of the present application it will be recommended as a preferable arrangement to vary the water temperature, i.e. the mixing ratio of cold to hot water, by pivoting the water outlet about an approximately vertical axis so that, for example, setting the water outlet to the left corresponds to "cold" and to the right "hot".

The arrangement of a setting angle, determined by a carrier, subsequent to the turning of which the commencement of the regulation is introduced, enables the water outlet to be brought into, for example, the most-preferred "middle position" after selection of the desired temperature, without having to alter the previous setting. A variation of the temperature is still possible, by small pivoting actions "touching", of the water outlet, to left or right.

The introduction of an overidable spring detent in the area of the pivot angle, which determines the water outlet quantity, is also new and of great importance in that an "economy position" can be marked by it, in which only half of the water quantity flows out. This alternative is particularly meaningful in the context of water and energy saving. If a greater quantity of water is required, one simply presses a little harder thus overriding the "economy position".

For the practical construction of a water mixer unit according to the invention two features are prominent which substantially favour the dimensions and thereby the simplicity of assembly.

Firstly, it is possible to arrange at least one part of the universal joint inside the hemispherical sealing surface. This achieves a compact location of the individual parts and also a protected and space-saving, i.e. cost-saving, solution.

The second substantial improvement of the complete assembly is to arrange the main axis of the mixer unit not vertically but supported somewhat tilted, namely about approximately half of the pivot angle of the water outlet. This means, firstly, that the connection piece, in a final position (fully turned on) is approximately vertical and thereby the temperature adjustment can be comfortably carried out by pivoting about this, by now also vertical, axis.

The tilted position of the main axis about half of the pivot angle also functions in that the slot in the guide housing lies symetrically, which is very favourable for the location of all the parts in the interior. Not only that but the tilted position looks advantageously attractive.

It will also be recommended to provide a shoulder or assistance, for example by suitably shaping the water outlet, to simplify operation by the back of the hand or the elbow.

Particular eminence also arises from the ability to identify specific locations or positions of the water outlet. The pivot movement could for example be snapped into the "cold" position then "warm" and finally "hot".

The same would be true for example in a combination of two pivot movements where the water quantity setting is also simply adjustable over detents "low", "medium" and "full". The detents naturally in no way prevent the choice of an intermediate setting. A particularly advantageous arrangement of the regulating elements with planar sealing surfaces from, for example ceramics, is given when the plane of the sealing surfaces is approximately vertical to the pivot axis of the water outlet. Slight variations from the precise vertical position, which under some circumstances for reasons of layout shapes could be useful, are unimportant in that they are easily compensated for by the usually necessary transmission element.

This arrangement also enables the twisting of one of the moveable parts, for example, about the pivot axis of the water outlet and the coupling of these two movements.

The arrangement of a cam, for example, in the shape of an eccentric either directly on the water outlet or on a connection piece connected to it, enables a simple overlapping of a second movement on the part.

Through the combination of both the above-mentioned arrangements it is possible, with one single transmission element, to change both pivot motions of the water outlet, for example, about one approximately horizontal axis and about one second axis lying approximately vertical to it, once in one rotation and once in a parallel sliding action of the moving parts.

The desired function lies in that, for example, by the pivoting of the water outlet about a horizontal axis to adjust the water quantity or to turn it off, and by the pivoting of the water outlet about a second axis which is vertical, the mixing temperature of the hot and cold water is brought about by sectional alteration in the overlapping of the openings in the regulating elements.

A further improvement of the inventive concept is in the embodiment of such a device with a setting angle between the travel of the water outlet and the travel of the moving parts coupled to it.

The reason for such a measure is to be able to swing the stream of water side to side, for example in the wash basin, without immediately causing a change in temperature, while adjustably mixing temperature by sideways pivoting of the water outlet about its axis in the area of the setting angle.

The positioning of the plane of the sealing surfaces, according to the invention, vertical to the pivot axis of the water outlet enables the additional arrangement of a further independent regulating element, that consists likewise of at least two parts with planar sealing surfaces which are moveable towards each other.

This additional regulating element can also be operated by pivoting of the water outlet. An example can be drawn from the shut-off function in the case of kitchen mixer units which have the task of protecting a washing or washing-up machine which are usually connected by a flexible pipe.

For specific functions such as, for example, the "economy position" of the water outlet, it will be proposed in accordance with the invention to provide a spring detent which can only be overcome by an additional exertion of strength.

The subject of the present invention arises not only from the subject of the individual patent claim but from the combination of the individual patent claims one with another.

All the details and features disclosed in the documents, particularly those in the drawings illustrating the layout are claimed as being essential to the invention, in so far as they are new, either individually or in combination, compared with the state of the art.

In the following, the invention will be explained by means of drawings illustrating merely one embodiment example. Hereby arise from the drawings and their descriptions, further features and advantages essential to the invention.

BRIEF DESCRIPTION OF THE SEVERAL VIEWS OF THE DRAWINGS

FIG. 1: Schematic pivot operation of the water mixer unit according to the invention FIG. 2: The pivot operation of the water mixer unit about a vertical axis, seen in side view.

FIG. 3: Same illustration as in FIG. 2, plan view.

FIG. 4: Section through a water mixer unit according to the invention.

FIG. 5: Section through a modified embodiment example of a water mixer unit compared to FIG. 4.

FIG. 8: Section through a water mixer unit with ceramic plates as regulating elements.

FIG. 9: Partial section through the water outlet of the water mixer unit in FIG. 8 with inserted connection piece.

FIG. 10: Section through the water mixer unit in FIG. 8 in the closed position

FIGS. 11 to 14: Schematic illutrations of various regulated positions.

FIG. 15: Section through an asymmetric embodiment of a regulator fitting with plate seals and without grips.

FIG. 16: Side view of the arrangement in FIG. 15.

FIG. 17: A further section through the arrangement in FIG. 15.

FIG. 18: Illustration of the self-covering openings in the plate seals.

FIG. 19: A further variant of a grip-less regulator fitting in comparison with FIG. 15.

FIG. 20: A section of the embodiment according to FIG. 19 rotated through approximately 90°.

FIGS. 21 and 22: Details of the plate seals.

FIG. 23: A further section through the arrangement in FIG. 15.

DETAILED DESCRIPTION

Figure 6:
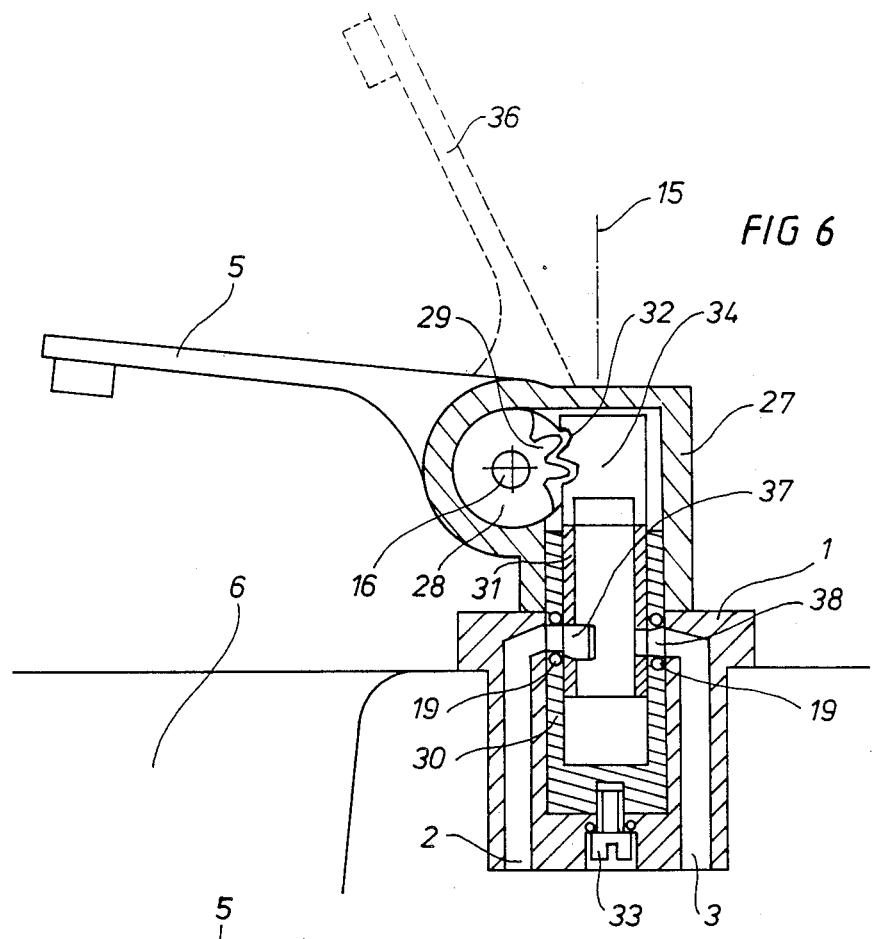
FIG. 6: Section through a further modification of a water mixer unit with combined pivot action seen in side view.

FIG. 1 illustrates a schematic illustration of the pivot action about a horizontal axis (16) seen on its end. The valve body (1) carries the water outlet (5) which is pivot-mounted about the axis (16). The influence of the regulating elements (4) (not illustrated) is in the area (7). It can be clearly seen from FIG. 1 that in this case the water can only flow into the container (6).

FIG. 1 also schematically illustrates a shoulder (11) which makes pivoting of the water outlet easier.

FIGS. 2 and 3 schematically illustrate the pivoting of the water outlet (5) about a vertical axis (15) in which the same parts have the same index numbers.

By pivoting of the water outlet (5) into the detented positions (12)(13)(14) one achieves first the "cold" position (12), then the "warm" position (13) and finally the "hot" position (14).

All three positions are contained in area (7) in which the influence of the regulating elements (4)(not illustrated) takes place. A pivoting to the left together with an opposite sequence of positions is naturally perfectly possible. FIGS. 1 and 3 show clearly that by a complete pivoting of the water outlet (5) the water container and the area above it can be used without inconvenience.

FIG. 4 illustrates a section through a complete mixer unit which can be operated without any hand grips, just by pivoting of the water outlet (5) about the axis (16). The regulating element (4) is rotatably mounted in the valve body (1) with the warm water supply (2) and the cold water supply (3). The water outlet (5) is mounted on the regulating element (4) and rigidly fixed to it by a screw (17). The seals (18) for example O-rings ensure a sealing of the regulating element (4) against the housing and/or against the water outlet. The seals (19) which surround the water supplies (2) and (3) ensure that when the regulating elements (4) are in the zero position no water can enter the regulating element. By means of a corresponding angle adjustment of the holes (20), one can program the mixture of hot and cold water. The pin (21) with its associated spring (22) together with the recess (23) in the water outlet (5) limit the pivot range. By means of corresponding detents which are engaged by the pin (21) under the load of the spring (22) one can achieve, in simple fashion, spot-positioning. Naturally this type of location is only to be seen schematically as there are numerous possibilities of achieving this function by other practical solutions.

The embodiment example in FIG. 4 shows how drastically simplified a mixer unit according to the invention can appear.

FIG. 5 shows another variant of the water mixer unit according to the invention, shown schematically, in which the same parts are identified by the same index numbers. Additionally, in this embodiment example, a further regulating element (9) is available which is rigidly attached to the hand grips (8) by the screw (24).

The pre-settable regulating element (9) is mounted in regulating element (4) and has holes (25) which, depending on angular position cover, more or less, the holes (20) in the regulating element (4). In this fashion by means of corresponding angular adjustment of the holes (20) and (25) the average ratio of cold water throughput to that of the hot water throughput can be so pre-set by rotation of the hand grip (8) that the desired mixture temperature is achieved. The pivoting of the water outlet (5) in this case controls only the quantity of water outflow.

Naturally in a reverse function the second regulating element (9) is also possible in that it determines only the quantity of water and the pivoting of the water outlet (5) corresponds to determined temperatures. The arrangement of a thermostatic system as regulating element (9) is practically very simple to achieve.

There is nothing further to be said about the way in which the holes (20) and/or (25) are to be arranged in order to achieve the described function as this belongs to the absolute state of the art. The angle of rotation of the knob (8) can be limited to, for example, a stop pin which is arranged in an annular recess in the grip (8).

Figure 7:
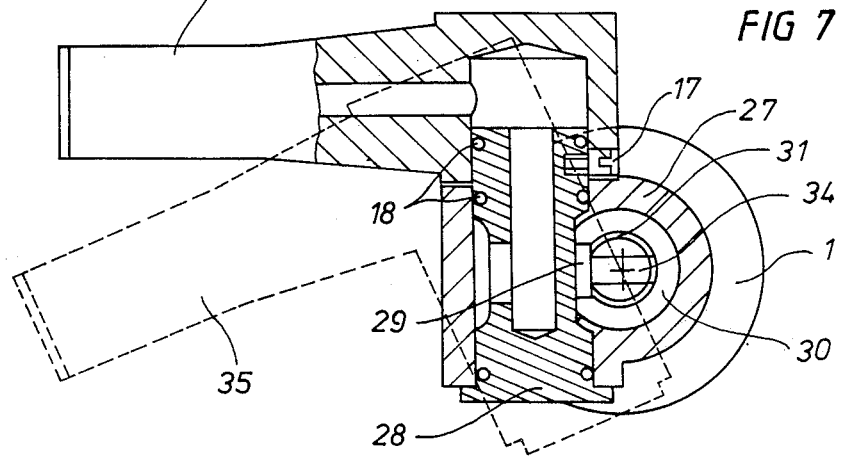
FIG. 7: Same illustration as FIG. 6, plan view.

FIGS. 6 and 7 show an example embodiment of a mixer unit with combined pivot movement. The pivoting about a horizontal axis influences the quantity of the outflowing water and/or the shutting-off of the water supplies (2)(3). The pivoting about the vertical axis (15) influences the average ratio of hot and cold water throughput and therewith the water temperature. The arrangement of detented positions is also possible in this case, so that for each of the positions "low", "medium" and "full" water quantities it is easy to adjust the temperatures "cold", "warm" and "hot".

FIGS. 6 and 7 show sections through a double-pivot mixer unit which the same parts are identified by the same index numbers as in the other figures.

The water outlet (5) is, in this case, pivotable about the horizontal axis (16) and is rigidly fixed to the rotatable insert (28) by the screw (17). The rotatable insert (28) has teeth (29) which engage in the opposing teeth (32) in the flattened part (34) of the control piston (31). By pivoting the water outlet (5) not of the position "off" (36) indicated by dotted lines in FIG. 6, the control piston (31) is moved upwards and opens, more or less, the holes (37) and (38). In this way the total quantity of water outflow is influenced.

By pivoting the water outlet (5) about the vertical axis (15) into the position (35) indicated by dotted lines, the complete pivot housing (27) turns in relation to the actual valve body (1). The control piston (31) guided against torsion in the pivot housing (27) thereby rotates in the vertical bearing bush (30) which is itself rigidly fixed to the valve body (1) by the screw (33).

The angularly offset holes (37) and (38) thereby alter the section of the hot and cold water passage and thus the temperature of the water outflow.

It must be emphasized, even in this description of an example of a double-pivot mixer unit, that all previously known combinations with other regulating elements, e.g. flow limiters, thermostat systems of all types, backflow shut offs, filters etc are completely feasible.

The water outlet can, as illustrated, be asymmetric or also of a symetrical designed arrangement. A fork-shaped formation of the water outlet with an extension on both sides of the valve body is likewise mentioned.

FIG. 8 shows, by way of an example, a schematic sketch of a water mixer unit with ceramic plates acting as a regulating element. The sketch is in no way restrictive in relation to the embodiment as both the complete fitting or the parts therefrom can be varied according to the state of the art.

In FIG. 8 the valve body (1) is shown as a cylindrical tube which exits into a ball-shaped guide housing (45). The cold and hot water supplies (2) and (3) overlap in FIG. 8 in that they lay one behind the other. The water outlet (5) is connected in form-locking fashion to the approximately hemispherical sealing surface (47) by a connecting piece (46). The guide housing (45) has a slot (48) in which the connecting piece (46) can perform a pivot motion about the pivot axis (42) which is substantially horizontal. The O-ring (70) seals elastically.

In this hemispherical sealing surface (47) a wall (54) is provided, which embraces the slide axis (60) of the universal joint (43). In the slot (56) of the universal joint (43), the fork (57) of the transmission part (39) is guided. The fork (57) transmits all sliding and turning motions of the universal joint (43) (and therefore of the outlet 5) onto the slideable part (40). The part (41) is securely set into the retainer (58). The retainer (58) is pushed into the valve body (1) and is fixed by, for example, a threaded ring (59). The O-ring (55) ensures a sealing of the retainer (58).

In FIG. 8, the open position of the unit is illustrated. In this case the opening (61) in the fixed part (41) aligns with the opening (62) in the slideable part (40). The water can flow in, for example, from the supply (2) through the openings (61)(62) and (63) in the transmission part (39) in the mixing chamber (64) and thus reach both sides of the well (54) in the drilling (65) of the connection piece (46) and finally the water outlet (5). The O-rings (69) are important for sealing.

In FIG. 10, the unit is shown in the closed condition. The water outlet (5) is pivoted upwards together with the connection piece (46) the sealing surface (47) and the wall (54). The slide axis (60) together with the fork (57) with the transmission part (39) and the slideable part (40) are moved in relation to part (41) and the openings (61) and (62) are no longer aligned. The water through-flow is shut off.

In FIGS. 11 and 14 the different regulating positions of the slideable parts (40) and (41) are schematically shown. For ease of illustration the openings (61) and (62) are shown as narrow rectangles. The openings (61) and (62) are for cold water and the openings (66) and (67) are for hot water.

FIG. 11 shows both passages open and thereby lukewarm water.

FIG. 12 shows both passages closed and thereby no through-flow.

FIG. 13 shows only openings (61) and (62) aligned and thereby cold water.

FIG. 14 shows only the openings (66) and (67) are aligned and thereby hot water.

The intermediate positions then correspond to the differing water quantities and/or temperatures. By means of other shapes and positions of the openings (61)(62) and (66)(67) a detailed optimisation and fitting is possible which is already carried out by numerous uses of ceramic plates.

In FIGS. 8 and 9 the arrangement of a cover (52) for the protection of the slot (48) against dirt and foreign bodies is schematically shown. In this example the cover is an integral part of the water outlet (5) it can however be likewise formed as an intermediate piece that is, for example, slid onto the connection piece (46). The usage of such a cover is made easy by the fact that the outer shape of the unit is a ball-surface and thus the cover can follow all pivoting and turning motions.

In FIGS. 8 and 9 the arrangement of a setting angle (50) between the water outlet (5) and the connection piece is also shown as an embodiment example. The sectioned drawing in FIG. 9 shows the water outlet with inserted connection piece (46) which has a segmented slot (68) in which the screw provided as a dog (49) is freely rotatable in a setting angle before it takes with it the connection piece (46) in a form-locking fashion.

FIG. 10 shows schematically the arrangement of a spring detent (51) which is free in the area of the slot (48) but which runs out on the edge of the slot (48) before reaching the end-position. Depending on the strength of the spring fitted (69a) one can adjust the force required to overide the detent. This "economy" position is new and will be highly regarded. This example is also only to be understood as schematic and many other practical solutions are possible.

In FIGS. 8 and 9 the advantages of a tilting of the main axis (53) about approximately half of the pivot angle (44) can be clearly recognised. Thus, the main axis may be vertical or almost vertical. Firstly in FIG. 8 in the case of a completely open setting the axis of the connection piece (46) is approximately vertical and the water outlet is pivoted in an approximately horizontal plane which substantially contributes to ease of use. FIGS. 11-15 show that the slideable part (40) in this embodiment of the invention has two degrees of freedom of movement, namely a linear degree of freedom, as shown in FIGS. 11-12, and a rotational degree of freedom, as shown in FIGS. 13 and 14. Here all internal parts are symmetrical to the main axis (53) particularly the slot (48) which also determines the position of the cover (52) and the O-rings (70)- A host of other advantages can be taken from the illustrated embodiment example.

FIGS. 15 to 22 show schematic embodiment examples of units in accordance with the invention in which parts having the same function are, where possible, identified with the same index numbers in the main and additional applications.

FIG. 15 shows an extremely simple asymmetric embodiment of a grip-less mixer unit with plate seals as regulating elements for water quantity and temperature.

The water outlet (5) is, in this case, fitted onto a connection piece (46) and connected to it in a form-locking fashion. The water outlet (5) can be pivoted about the horizontal pivot axis (42) by the connection piece (46) that is set into the pivot housing (82).

The connection piece (46) is drilled axially from one side and conducts the mixed water through this central drilling (83) to the real water outlet (5) as shown in FIG. 19.

In a partial area the connection piece (46) is formed as an eccentric cam (71), of which however, only a crescent-shaped segment is recognisable in the sections FIG. 17 and FIG. 20 because of the central drilling (83).

The double fork (57) of the transmission element (43) to which the moveable part (40) is connected, surrounds the eccentric cam (71) and is slid into the rectangular cut-out (84) by turning the connection piece (46). This also slides the moveable part (40) in relation to part (41). This causes, in a known way, by an arrangement of the openings in the parts (40) and (41), as shown for example in FIG. 18, an asymmetric condition and therewith a differing coverage of the openings (61)(62) and/or (66)(67). The subsequent contra-rotating change of section ultimately determines the water temperature.

A pivoting movement of the water outlet (5) about the horizontal axis (42) is likewise transmitted from the rectangular cut-out (84) to the transmission element (43) and thereby to the part (40) which this time, however, leads to a rotation about the pivot axis (42) and through this to a similar section change in the coverage of the openings (61)(62). This means a decrease or increase of the water quantity outflow at an unaltered section ratio, i.e. at an unchanged temperature. Naturally any required regular characteristics can be set by different shaping of the openings (61)(62) and/or (66)(67) and their relative positions, FIG. 21 shows only one example.

The spring detent (51) shown in FIG. 15 as a spring-loaded ball is essential. It has the task of locating the position of the pivot motion of the pivot housing (82) about the axis (42) and thus the water outlet (5) connected to it into, for example, the half open position. In this way it is possible to define a so-called "economy" position. With somewhat stronger pressure one can overide the detent to obtain the required water quantity.

It remains to mention that the pivot body (82) in the valve body (1) is fixed by, for example, a screw (85) which runs in a segment slot (86) whose length limits the pivot angle about the axis (42).

The retainer (87) of the fixed part (41) is rigidly secured against rotation to the valve body (1) by means of, for example, a pin (88). The O-rings (70) serve to seal the individual components relative to each other. It can be seen here that it is possible to place all O-rings (89) on the pressure side, i.e. in front of the ceramic seal to form static seals. The remaining O-rings (70) which are moveable, i.e. used as dynamic seals, are located on the side of the open water outlet and are therefore not highly pressurized.

In FIGS. 19 to 23 another variant of a unit according to the invention is shown, this time with a symmetric arrangement of the component parts. The right regulating system is similarly constructed to that in FIG. 15, however, the water supply to the fixed part (41) from the cold and hot water supplies (2) and (3) is achieved through an adaptor (90) with internal channels (92)(93). The adaptor (90) can be simply produced from, for example, two plastic parts welded together. The complete regulating system is sealed on the outside by means of a screw-in plate (91) together with its O-ring (70). The transmission of the pivot movement of the water outlet (5) to the moveable parts (40) and (41) is achieved in the same way as for FIGS. 15 to 17.

The position, according to the invention, of the plane of the sealing surfaces vertical to pivot axis (42) enables the attachment of two further moveing parts (75) and (76) which select a second, rigid water outlet (79) but which is likewise operated by the pivot action of the water outlet (5). The arrangement can be of symmetrical construction as shown in FIGS. 19 and 20.

As no temperature or quantity regulation is necessary for such a safety shut-off, the operation can be achieved by a simple turning motion in the axis (80) which directly follows the pivot movement of the water outlet (5) about the axis (42). Simple cams (95) are provided in the pivot housing (82) which rotate the part (41) and turn against part (76).

FIG. 22 shows an example arrangement of the openings (96) and (97) in part (76) and the recessed cut-out (74) in part (75). In the illustrated position (fully turned on) the openings (96)(97) are covered by the outlines of the cut-out (74) and the water can flow from the inlet (78) through the opening (96) in the cut-out (74) and again through opening (97) to the outlet (79).

If the water outlet (5) is pivoted to the extreme upper 75° position, the cut-out (74) rotates to the dotted position and the water flow is cut off. For this construction and position of the openings and cut-outs other variants are possible where it is, for example, not necessary to close two openings (96) and (97).

Attention is particularly drawn to the simple supply of cold and hot water from the base of the valve body (1) to both regulating elements. A single adaptor (90) is sufficient to connect these systems. The O-rings (89) used to seal are only statically loaded.

For this arrangement according to the invention a spring detent is also recommended, as that in example FIG. 15, which, for example, marks the shut-off of the water system. The comments concerning the setting angle are also valid here. Numerous combinations and variants of the solutions only schematically shown in both examples are possible in accordance with the invention.

I claim:

1. A water mixer unit including a valve body (1); two water supplies (2 and 3) of different temperatures; at least one regulating element for the control of the water quantity and/or temperature, and a water outlet (5) in a water container (6), characterized as: that the water quantity and/or the mixing temperature of the water is influenced by the pivoting of the water outlet (5), said regulating element having two water ports in communication with, respectively, said two water supplies, said regulating element being movable in at least two degrees of freedom by said pivoting of said water outlet, with said degrees of freedom of movement controlling, respectively, said water quantity and mixing temperature.

2. A water mixer unit according to claim 1, characterized as: that the pivot action takes place about an almost vertical axis (15).

3. A water mixer unit in accordance with claim 1, characterized as: that the pivot action takes place about a substantially horizontal axis relative to the operator standing in front of it.

4. A water mixer unit in accordance with claim 1, characterized as: that pivot movements of the water outlet (5) take place both about an almost vertical axis and about a substantially horizontal axis, wherein said pivot movements control said degrees of freedom of movement of said regulating element and are so combined that one pivot movement determines the water quantity and the other pivot movement determines the mixing of the water from said water supplies of different temperatures, and thereby determines the temperature of the water outflow.

5. Water mixer unit in accordance with claim 4, characterized as: that at least one regulating element (4) is rigidly fixed to the water outlet (5).

6. Water mixer unit in accordance with claim 5, characterized as: that further regulating elements (9) are arranged coaxially with the pivoting water outlet (5).

7. Water mixer unit in accordance with claim 4, characterized as that as a regulating element two opposingly slidable parts (40 and 41) with planar regulation surfaces, for example, from ceramics, are present and are connected to the pivoting water outlet (5) by a transmission part (39), with one of said slidable parts being rigidly fixed to the water outlet.

8. Water mixer unit in accordance with claim 7, characterized as: that the transmission part (39) is connected, either form-locking or fixed to both pivot movements of the water and outlet (5) and to at least one of the slideable parts (40 and 41).

9. Water mixer unit in accordance with claim 8, characterized as: that the transmission part (39) is connected to a universal joint (43) rotatable about two axes at right angles to each other.

10. Water mixer unit in accordance with claim 7, characterized as: that as a regulating element, at least two parts (40 & 41) moveable relative to each other and having planar sealing surfaces of, for example, ceramics, are present which, with the movement of the water outlet (5) are kinematically coupled together, and that the plane of the sealing surfaces is vertical to a pivot axis (42) of the water outlet (5).

11. Device in accordance with claim 10, characterized as: that the water outlet (5) or a connection piece (46) coupled to it, has a cam, for example an eccentric cam (71) whose axis of rotation is approximately parallel to the plane of movement of the parts (40 and 41).

12. Device according to claim 10, characterized as: that a transmission element (43) is present, which is coupled on one side to the moveable parts (40) and on the other side with the eccentric cam (71) and the pivot movement of the water outlet (5) about the pivot axis (42).

13. Device in accordance with claim 12, characterized as: that a second regulating element consisting of at least two parts (75 and 76) moveable relative to each other with planar sealing surfaces are present.

14. Device in accordance with claim 13, characterized as: that the movement of the parts (75 and 76) relative to each other is coupled to the movement of the water outlet (5).

15. Device in accordance with claim 13, characterized as: that at least one of the water supplies (2 and 3) to the first regulating element is connected by the water inlet (78) to the second regulating element in the valve body (1).

16. A water mixer unit according to claim 1, characterized as: that the outflowing water quantity can be reduced to zero, i.e. shut off by the pivoting of the water outlet (5).

17. A water mixer unit according to claim 16, characterized as: that the pivot area (7) in which an influence of the regulating element takes place is so laid out that the water flowing from the water outlet (5) can only flow into the water container (6).

18. A water mixer unit according to claim 1, characterized as: that the complete area of pivoting is so extended that the water outlet (5) can be brought out of the area of usage above the water container (6).

19. A water mixer unit in accordance with claim 1, characterized as: that in the area (7) of pivoting, in which an influencing of the regulating elements is achieved, the supply of lower-temperature water (3) is gradually opened and by further pivoting of the water outlet (5) higher-temperature water is mixed in, in increasing quantities during which the lower-temperature water flow either remains the same or decreases.

20. Water mixer unit, including two water supplies of different temperatures; at least one regulating element for the control of the water quantity and/or temperature, and a water outlet in a water container, characterized as: that the water quantity and/or the mixing temperature of the water is influenced by the pivoting of the water outlet; that pivot movements of the water outlet take place both about an almost vertical axis and about a substantially horizontal axis and are so combined that one pivot movement determines the water quantity and the other pivot movement determines the mixing of the water from said water supplies of different temperatures, and thereby determines the temperature of the water outflow; that said regulating element includes at least two opposingly slidable parts with planar regulation surfaces, for example, from ceramics, one said slidable part being connected to the pivoting water outlet by a transmission part and another said slidable part being rigidly fixed to the water outlet; that the transmission part is connected, either form-locking or fixed, to both pivot movements of the water outlet; that the transmission part is connected to a universal joint rotatable about two axes at right angles to each other; and that one axis of the universal joint is parallel to one pivot axis of the water outlet but does not coincide with it.

21. A water mixer unit, including two water supplies of different temperatures; at least one regulating element for the control of the water quantity and/or temperature, and a water outlet in a water container, characterized as: that the water quantity and/or the mixing temperature of the water is influenced by the pivoting of the water outlet; that pivot movements of the water outlet take place both about an almost vertical axis and about a substantially horizontal axis and are so combined that one pivot movement determines the water quantity and the other pivot movement determines the mixing of the water from said water supplies of different temperatures, and thereby determines the temperature of the water outflow; that said regulating element includes at least two opposingly slidable parts with planar regulation surfaces, for example, from ceramics, one said slidable part being connected to the pivoting water outlet by a transmission part, and another slidable part being rigidly fixed to the water outlet, with the plane of said regulation surfaces being substantially at right angles to a pivot axis of the water outlet; and that one of said parts is coupled rotatably about the pivot axis of the water outlet.

22. Water mixer unit, including two water supplies of different temperatures; at least one regulating element for the control of the water quantity and/or temperature, and a water outlet in a water container, characterized as: that the water quantity and/or the mixing temperature of the water is influenced by the pivoting of the water outlet; that pivot movements of the water outlet take place both about an almost vertical axis and about a substantially horizontal axis and are so combined that one pivot movement determines the water quantity and the other pivot movement determines the mixing of the water from said water supplies of different temperatures, and thereby determines the temperature of the water outflow; that one part of said regulating element is rigidly fixed to the water outlet and another part of said regulating element is slidable with respect to said fixed part; that the water outlet is connected by a connection piece either form-locking or fixed to an approximately hemispherical sealing surface which is enclosed in a guide housing where the connection piece can be pivoted in a slot in the guide housing about the pivot axis.

23. Water mixer unit in accordance with claim 22, including a universal joint arranged at least in part inside the hemispherical sealing surface, said universal joint being operatively connected to said connecting piece and to said slidable part, for transmitting motions of said outlet to said slidable part.

24. Water mixer unit in accordance with claim 22, characterized as: that a cover is present which either partially or completely covers the slot.

25. Water mixer unit in accordance with claim 22, characterized as: that between the water outlet and the regulating element at least one dog is arranged, with a setting angle.

26. Water mixer unit in accordance with claim 22, characterized as: that an overridable spring detent is connected to the outlet and extends in part into said slot for determining the water quantity.

* * * * *